United States Patent
Lundin et al.

(10) Patent No.: US 10,706,113 B2
(45) Date of Patent: Jul. 7, 2020

(54) DOMAIN REVIEW SYSTEM FOR IDENTIFYING ENTITY RELATIONSHIPS AND CORRESPONDING INSIGHTS

(71) Applicant: Microsoft Technology Licensing, LLC, Redmond, WA (US)

(72) Inventors: Jessica Lundin, Seattle, WA (US); Ryen W. White, Seattle, WA (US); Kris K. Ganjam, Seattle, WA (US); Navendu Jain, Seattle, WA (US); Hua He, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 193 days.

(21) Appl. No.: 15/636,471

(22) Filed: Jun. 28, 2017

(65) Prior Publication Data

US 2018/0196881 A1 Jul. 12, 2018

Related U.S. Application Data

(60) Provisional application No. 62/443,459, filed on Jan. 6, 2017.

(51) Int. Cl.
| | |
|---|---|
| *G06F 16/9535* | (2019.01) |
| *G06N 20/00* | (2019.01) |
| *G06N 3/04* | (2006.01) |
| *G06F 40/30* | (2020.01) |
| *G06F 40/205* | (2020.01) |
| *G06F 40/295* | (2020.01) |
| *G06N 5/02* | (2006.01) |

(52) U.S. Cl.
CPC ........ *G06F 16/9535* (2019.01); *G06F 40/205* (2020.01); *G06F 40/295* (2020.01); *G06F 40/30* (2020.01); *G06N 3/0445* (2013.01); *G06N 20/00* (2019.01); *G06N 5/02* (2013.01)

(58) Field of Classification Search
CPC ............... G06F 17/278; G06F 17/2785; G06F 17/2705; G06F 40/30; G06F 17/16; G06F 40/216; G06F 16/9535; G06F 40/295; G06F 40/205; G06N 3/00; G06N 20/00; G06N 3/02; G06N 3/0445; G06N 3/0454; G06N 3/08; G06N 5/02; G10L 15/16
See application file for complete search history.

(56) References Cited

U.S. PATENT DOCUMENTS

| | | |
|---|---|---|
| 6,741,986 B2 | 5/2004 | Cho et al. |
| 6,820,237 B1 | 11/2004 | Abu-Hakima et al. |
| 7,201,311 B2 | 4/2007 | Liberti et al. |
| 8,060,513 B2 | 11/2011 | Basco et al. |

(Continued)

OTHER PUBLICATIONS

Xu et al., "Classifying Relations via Long Short Term Memory Networks along Shortest Dependency Paths", Proceedings of the 2015 Conference on Empirical Methods in Natural Language Processing, pp. 1785-1794, 2015 (Year: 2015).*

(Continued)

*Primary Examiner* — David T. Brooks

(57) ABSTRACT

A system and method is provided for generating a dynamic comprehensive domain review. A domain review engine obtains authoritative literature associated with a domain to extract insights using entity recognition and relationship extraction, and ranks the extracted results to generate a dynamic domain review.

20 Claims, 11 Drawing Sheets

(56) References Cited

U.S. PATENT DOCUMENTS

| | | | |
|---|---|---|---|
| 8,488,916 B2 | 7/2013 | Terman | |
| 9,043,356 B2 | 5/2015 | Bao et al. | |
| 9,201,876 B1 | 12/2015 | Kumar et al. | |
| 9,317,498 B2 | 4/2016 | Baker et al. | |
| 9,323,827 B2 | 4/2016 | Schilit et al. | |
| 9,361,587 B2 | 6/2016 | Bounouane et al. | |
| 2004/0093331 A1 | 5/2004 | Garner et al. | |
| 2005/0144162 A1 | 6/2005 | Liang | |
| 2006/0041424 A1* | 2/2006 | Todhunter | G06F 16/345 704/9 |
| 2008/0243889 A1* | 10/2008 | Chen | G06N 5/022 |
| 2010/0082331 A1* | 4/2010 | Brun | G06F 17/2705 704/9 |
| 2010/0324927 A1 | 12/2010 | Tinsley | |
| 2011/0295903 A1* | 12/2011 | Chen | G06F 16/367 707/794 |
| 2012/0221583 A1* | 8/2012 | Kulack | G06F 16/2291 707/755 |
| 2013/0339005 A1* | 12/2013 | Zhang | G16B 40/00 704/9 |
| 2016/0098645 A1* | 4/2016 | Sharma | G06N 7/005 706/12 |
| 2017/0177715 A1* | 6/2017 | Chang | G06F 17/2785 |
| 2017/0193397 A1* | 7/2017 | Kottha | G06F 17/2785 |
| 2017/0213130 A1* | 7/2017 | Khatri | G06F 16/345 |
| 2017/0278514 A1* | 9/2017 | Mathias | G10L 15/22 |
| 2017/0300565 A1* | 10/2017 | Calapodescu | G06F 16/353 |
| 2017/0329772 A1* | 11/2017 | Pol | G06F 16/34 |
| 2018/0121539 A1* | 5/2018 | Ciulla | G06F 16/367 |

OTHER PUBLICATIONS

Lawrence, et al., "Digital Libraries and Autonomous Citation Indexing", In Journal of IEEE Computer, vol. 32, No. 6,, Jun. 1999, 8 pages.

* cited by examiner

Alcohol consumption and self-reported sunburn: A cross-sectional, population-based survey Kenneth J. Mukamal, MD, MPH, MA
From the Department of Medicine, Beth Israel Deaconess Medical Center

Abstract | Full Text | References

Background
Heavy drinking has been associated with several cancers, including melanoma and basal cell carcinoma.

Objective
The purpose of this study was to determine whether excessive drinking is associated with sunburn, a risk factor for skin cancer.

Methods
As part of the 2004 Behavioral Risk Factor Surveillance System, a population-based telephone survey, 299,658 adults reported their use of alcohol in the preceding month and a history of sunburn in the preceding year.

Results
Approximately 33.5% of respondents reported a sunburn within the past year. Heavier average alcohol use and binge drinking were both positively associated with prevalence and number of sunburns within the past year. The adjusted odds ratios for prevalence and number of sunburns among binge drinkers were 1.39 (95% confidence interval 1.31-1.48) and 1.29 (95% confidence interval, 1.20-1.38), respectively. Associations tended to be of similar magnitude for average alcohol use and in all subgroups evaluated.

Limitations
This study was cross-sectional and relied upon participant self-report.

Conclusion
Excessive drinking is associated with higher rates of sunburn among American adults. The observed relationship typifies the high-risk behavior associated with excessive drinking and suggests one pathway linking alcohol use with skin cancer.

302

304

306

Example on the previous abstract:
Entity A (Excessive Drinking) leads to Entity B (Sunburn), Given Context ("American Adults")

FIG. 3

DOMAIN REVIEW SYSTEM FOR IDENTIFYING ENTITY RELATIONSHIPS AND CORRESPONDING INSIGHTS

CLAIM OF PRIORITY

This application claims the benefit of U.S. Provisional Patent Application Ser. No. 62/443,459, entitled "Identifying Key Insights in Authoritative Texts" and filed on Jan. 6, 2017, which is hereby incorporated by reference in its entirety for all intents and purposes.

BACKGROUND

Search engines and data analytics are tools used every day by individuals, companies and organizations to retrieve information and analyze data pertinent to the entity requesting the search or the data analysis. Many different types of search engines are used to retrieve information, and likewise many different approaches are used to analyze data. Search engines may be used to search the internet, certain domains or specific databases. Search engines can be used to retrieve a variety of information, from that which is commonly available to information specific to a particular field. Data analytics may be used to analyze past data, report on current information or predict future performance. Both searches and data analytics rely on algorithms and various techniques to parse the data available and achieve meaningful results.

SUMMARY

Aspects of the disclosure provide a domain analysis engine that obtains literature associated with a domain to extract insights by identifying a domain associated with a search request and the corresponding literature, recognizing entities within the literature extracting relationships between the recognized entities, defining the relevant context of the search based on the extracted relationships between the recognized entities, generating results to the query based on the determined context of the query and the relevancy of returned results, and ranking results for use in a comprehensive domain review. As used herein, a domain may refer to a specified sphere or area of knowledge. For example, without limitation, a health domain may encompass health-related knowledge, while a software domain may encompass computer software-related knowledge. A domain may have more or less granularity in these examples.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is an illustrative example of entity identification.

Corresponding reference characters indicate corresponding parts throughout the drawings.

DETAILED DESCRIPTION

Figure 1:
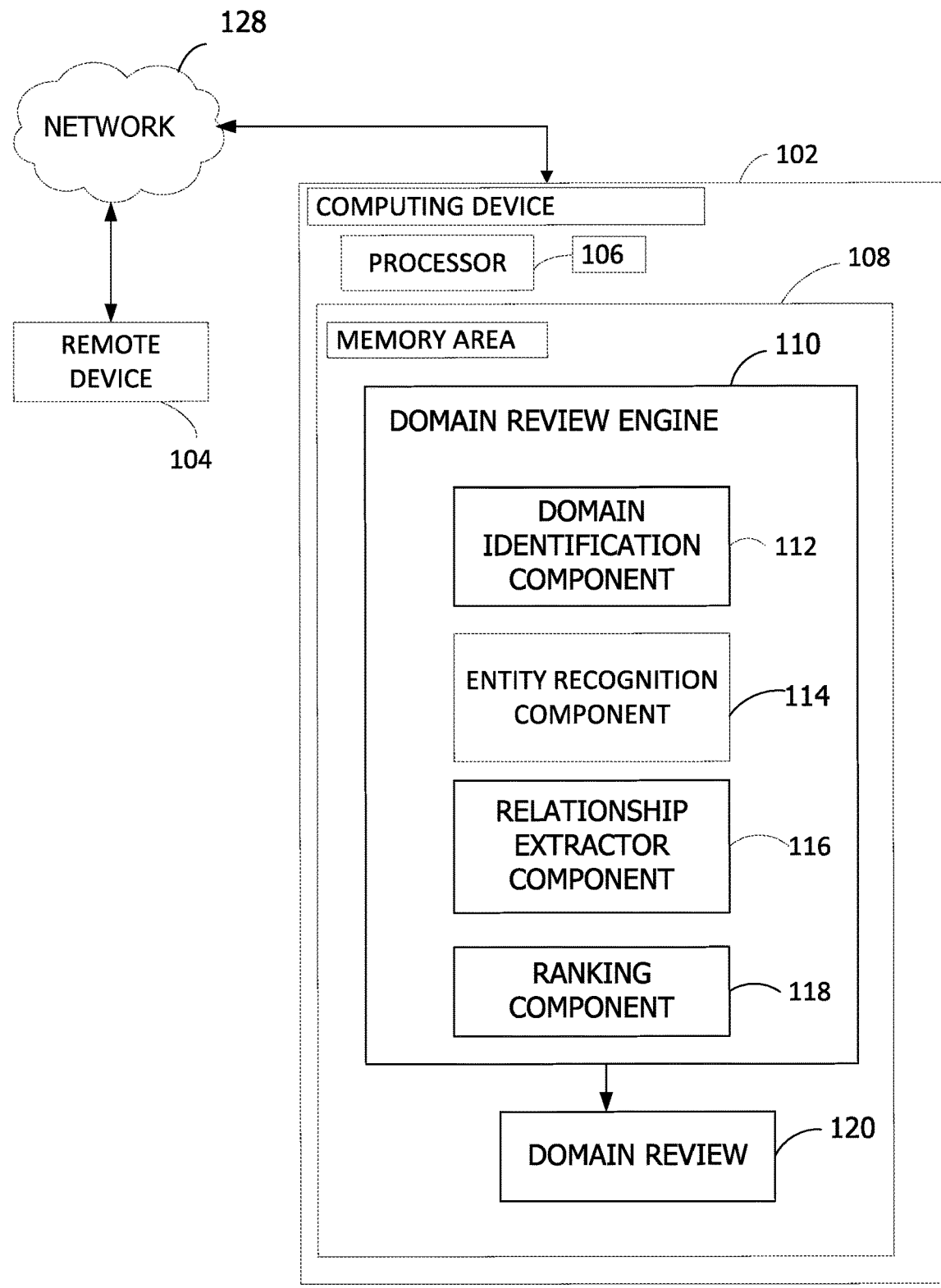
FIG. 1 is an exemplary block diagram illustrating a computing device for generating a comprehensive domain review.

Referring to the figures, examples of the disclosure enable a system to identify insights in a corpus of texts based on searching techniques and data analytics described herein. The system generates a comprehensive review of domains based on the relationship between entities in the requested search and, in some cases using input from a user and in other cases, using machine learning or a combination of both user input and machine learning. The review of domains may be dynamically generated at the time of the user query or may be pre-computed and indexed by the system, and retrieved by the system when a relevant query is submitted. The results offer insights into topics and issues which are pertinent to the user, entity, or system requesting the information. For example, suppose a particular study concludes that 'sleep disturbances in middle-aged men are likely associated with diabetes.' If a user submits a query asking 'sleep disturbances causes what?' along with a given context of the demographic 'middle aged men,' the output would be 'diabetes' due to the cause-effect relationship detected. In comparison, a conventional search engine would not understand the 'cause-effect' relationship and would return results based on matching terms with sleep disturbances and potentially the demographic. Thus, with the system, insights may be extracted from medical studies or journals related to medical information relevant to a user. In other examples, solutions to technical problems may be found on technical websites. Thus, the systems and methods described herein extract insights or findings from a corpus of texts, which may include authoritative literature, non-authoritative literature, enterprise documents, case notes, bug reports, trouble tickets, websites, forums, and/or any other suitable source to dynamically generate the comprehensive domain review.

Aspects of the disclosure further provide increased user interaction performance by providing dynamic domain review data for use with other applications and/or user devices, enabling a user to obtain contextually relevant insights and findings for a given domain.

Aspects of the disclosure further enable increased computer performance and efficiency at least because the domain review engine dynamically searches and analyzes domain data, generating a comprehensive domain review that identifies insights and conclusions pertinent to a domain, providing a domain overview with a more efficient use of resources. By dynamically generating the domain review as described in this disclosure, some examples reduce processing load and/or increase processing speed by strategically managing computational, processing, memory, and/or other resources. The effect of analyzing domain data, such as authoritative literature, to identify and extract insights improves performance of other applications as well as of the device hosting the application, because it reduces the processing and computational resources required when data is requested for the domain. Additionally, some examples may conserve memory, reduce network bandwidth usage, improve operating system resource allocation, and/or improve communication between computing devices by streamlining at least some operations, such as data storage and data access, by automating at least some operations.

Various mathematical models and techniques are used in describing the present disclosure and various implementations but such descriptions do not limit the scope of the disclosure. Other mathematical models and techniques may be used to obtain similar results based on the methods and systems described herein.

Data analytics is the term used to describe the analysis of data for a variety of purposes. For example, a business may analyze its sales data to determine its revenue. It may further analyze its expenses to determine costs and then combine the analysis to determine the profits of the company. It may combine its profit analysis over a time period, such as months or years, to show growth of the company. Likewise, the government may conduct surveys or studies to collect analysis data. An example of this would be quarterly unemployment reports. The government collects data corresponding to how many people are working, not working, looking for work, out of the work force, etc. The data will then be analyzed to determine an unemployment rate.

While data may be analyzed to report on events that have already happened, data may also be analyzed to determine future events. Such data analysis is termed predictive analysis. An example of predictive analysis would be to analyze data over several years pertaining to sales of a particular company and then using that data to forecast sales in the future. For instance, a company may make $100 in the third quarter of a particular year. In the previous year, the company may have made half that amount in the same quarter, but sales rose by 50% in the fourth quarter of that year. The company may combine the third quarter sales of the current year, with the growth rate of the previous year and forecast $200 of sales for the fourth quarter of the current year. This is a simple form of predictive analysis, and it should be appreciated that other methods exist that are more complex and may provide better ability to predict future performance.

Algorithms are used to analyze data in this manner. These algorithms may use simple or complex techniques in order to perform data analysis. The preceding example of predicting sales is an example of a simple technique. More complex calculus may be used and may take into account such variables as number of employees, competitor analysis, market performance, and even the weather. Predictive analytics, as a form of data analysis, uses many techniques to collect and analyze data. Some such techniques are modeling, datamining, statistical analysis, machine learning, artificial intelligence and the like. Computing devices aid in performing the algorithms and techniques necessary to perform complex predictive analysis. Indeed, in many cases, performing the complex analysis may be impossible or impractical without the aid of a computing device or devices.

Complex predictive analysis may take advantage of new types of computing devices which have superior architectures for analyzing data and predicting results. There are many different types of computing architectures that may be used to analyze data. An artificial neural network is a type of processing architecture that is inspired by the way the human brain works, specifically the structure and connections of the neurons in the brain. In the same manner, an artificial neural network is composed of a large number of highly interconnected processing elements which is similar to the neurons in the brain. These interconnected processing elements work collaboratively as a unit to solve problems. In some cases, the processing elements may work simultaneously while in other cases they may work sequentially.

In addition to being more efficient than previous architectures, newer architectures may provide abilities not previously available. For example, one aspect of artificial neural networks is the ability of the network to learn from the neural network itself. This is accomplished by using the output of the network as an input back into the network. Another aspect may be the ability of this type of network to work in unison while solving specific types of problems. Artificial neural networks may be particularly useful in situations where learning is important due to the iterative nature of the problem that is being solved. For example, an artificial neural network is configured for a specific application, such as pattern recognition or data classification, through a learning process. This mirrors the learning that is done in biological systems. Learning in biological systems involves adjustments to the synaptic connections that exist between the neurons. This is true of artificial neural networks as well.

A search engine is a software system that is designed to search for information on the internet. The search engine outputs a list of results which may be viewed and explored by a user of the search engine. The results may be a mix of web pages, images, documents, presentations, links, and other types of files. Data is acquired by "crawling" which is the acquisition of data about a website. The technique of crawling involves scanning the site and retrieving any relevant data about the site such as the title, keywords, date of creation, pictures associated with the site, author information. Depending on the nature of the crawling algorithm used, data may be retrieved about other aspects of the website, such as formatting used, non-related information present on the site, among other items. The search engine then stores the information retrieved in databases that may be used a later time to more efficiently retrieve the relevant data without re-parsing all the data. Often the crawling is performed based on search criteria input by a user or another system into the search engine.

The search engines employ mathematical equations (algorithms) to sort the relevant information. The search engines then rank the relevant information based on certain criteria. For example, the search engine may rank the relevant information by popularity. Still other methods of ranking the pages may be used, such as the recurrence of search results in the particular page. In addition to general search engines, there are specialized search engines that are used to retrieve data. For example, a search may focus on a certain subject area or domain, with content often accessible through a specialized interface. Or a search engine may look for information on certain databases that provide the user with search capabilities not found elsewhere or even information that is not generally accessible through normal search engines.

Search engines working with artificial neural networks have the capacity to greatly enhance search efficiency, capability and availability. For instance, search engines may be able to proactively search based on a user's history, actions or other events instead of relying on input from the user as to what the search parameters should be. These searches may provide useful information to a user which the user may not have otherwise considered. Search engines working with artificial neural networks may be better able to predict the types of results that a user may find useful. This is only a few examples of the potential uses of such advanced search engines. Other uses may be apparent to one skilled in the art. In addition, it should be noted that the architectures and systems described herein are not limited to common types of search engines, but may be applicable to a variety of data searching applications and systems.

Referring to FIG. 1, an exemplary block diagram illustrates a computing device for generating a domain review. In the example of FIG. 1, the computing device may represent a system for receiving search requests, identifying a domain associated with the search request, recognizing entities in the identified domain data, extracting relationships between the recognized entities, and ranking results for use in a comprehensive domain review. In some examples, a search may be initiated from another computing device, such as remote device 104 for example. In other examples, domain review engine 110 may initiate a search to generate a dynamic review for a particular domain. The computing device 102 may include processor 106 and memory area 108. Memory area 108 includes domain review engine 110, which is a component that generates a dynamic review for a given domain using search and data analytic techniques, as well as machine learning, to identify and extract insights, findings, and other conclusions from authoritative literature of the domain. Domain review engine 110 includes domain identification component 112, entity recognition component 114, relationship extractor component 116, and ranker component 118.

Domain identification component 112 identifies the particular domain, and/or context, associated with a search request or domain review request in order to target literature particular to that domain for search and analysis. The context may be identified using contextual features or dimensions, metafeatures, extracted features, and the like. Domain identification component 112 may identify search subjects based on the search criteria and determine the appropriate domain, for example. Entity recognition component 114 parses the authoritative literature and/or other data identified by the domain identification component 112 to recognize and identify individual entities. An entity is a component of the searched query which the system ascertains to be distinct from other components of the search in the context of the search. For example, pronouns such as "a", "an", or "the" or often not distinct in the context of a query, but a noun such as "Arkansas", "cancer" or "dissertation" may have distinct relevancy. Relationship extractor component 116 analyzes the parsed data to determine relationships between the recognized entities, extracting those identified relationships between the entities. In some examples, the identified relationships may be causal relationships or correlation relationships between the entities, linked by a clue word or phrase that forms a dependency between the entities within the parsed subject matter. Ranking component 118 uses the identified entities from entity recognition component 114 and the extracted relationships from relationship extractor component 116 and ranks the data identified by the domain identification component 112 to generate results. These generated results may then be communicated back to the requesting entity, in some examples, or aggregated with other results for the domain to build domain review 120. Domain review 120 is a dynamic, comprehensive domain review. As used herein, a domain review refers to a collection of data that provides an overview of insights, findings, conclusions, and/or facts associated with a given domain. The domain review may be determined for any time period.

Figure 2A:
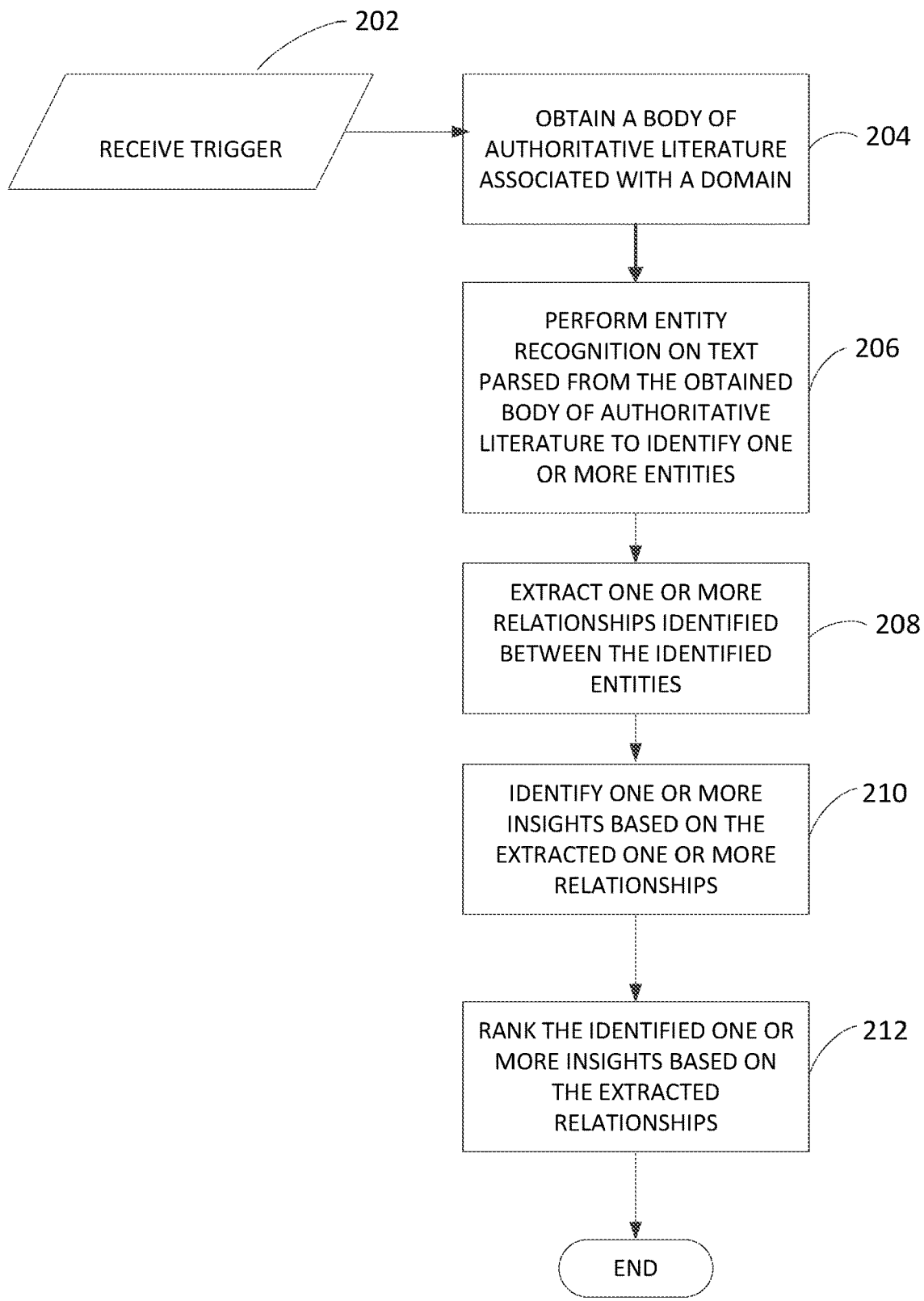
FIG. 2A is an exemplary flow chart illustrating operation of the computing device to identify insights for a domain review.

Referring to FIG. 2A, an exemplary flow chart illustrates operation of a domain analysis engine to identify an insight corresponding to a domain. The illustrative process may be performed by an analysis engine, such as domain analysis engine 110 in FIG. 1, for example.

The process begins at operation 202 by receiving a trigger. A trigger may be initiated based on criteria such as the occurrence of a specific event, a predetermined trigger or schedule, or a request for domain information, for example. In some examples, the process may also be automated in that it may be performed without user interaction or direction based on some criteria or may be initiated based on a form of machine learning or artificial intelligence. Any manner of initiation is contemplated by this disclosure and is not limited to the described initiation processes described herein.

The process continues by obtaining a body of authoritative literature associated with a domain at operation 204. In some cases, a body comprising both authoritative and non-authoritative literature is obtained. As used herein, a body of literature may refer to authoritative literature, non-authoritative literature, enterprise documents, case notes, bug reports, trouble tickets, websites, forums, and/or any other suitable text source. The body of literature may be obtained by an identification component of domain review engine 110 in FIG. 1, such as domain identification component 112, for example. A subject for a search or domain review generation may be a specific domain or area of interest, such as health care, computer programming, architecture, or any other suitable area of interest. In some examples, the subject may comprise more than one domain, and indeed, may comprise a set of domains. The process may identify a search subject or domain initially in order to obtain the data, such as the body of authoritative literature, associated with the domain, for example. In some cases, the authoritative literature may be abstracts or summaries of professional journals, peer-reviewed publications or studies, and the like.

The process performs entity recognition using entity recognition component 114 on text parsed from the obtained body of authoritative literature to identify one or more entities at operation 206. Entity recognition may be performed using any number of methods. For example, simple sentence parsers or shallow parsing/dependency parsing techniques may parse the sentence searching for nouns, adverbs, verbs or other sentence components. These parsers may also identify punctuation or other elements of sentence structure which may aid in entity recognition. Upon parsing the sentence, entity recognition component 114 may return a list of entities. Other forms of entity recognition are contemplated, as further described in relation to FIG. 3. Additionally, domain dictionaries or other sources of definitions may be used to aid entity recognition component 114 in parsing the information or to enable the system to learn how to recognize entities.

The process extracts one or more relationships identified between the recognized entities at operation 208 using relationship extractor component 116. Relationship extraction is performed on the entities recognized by entity recognition component 114 in addition to any relevant phrases or words that are related to the identified entities. However, relationship extraction may also be performed independent of entity recognition and may be based on other criteria. Relationship extraction may be performed by any number of methods. Methods of relationship extraction have been found to have different success rates depending on the context and searches performed. Some such methods are causal analysis, which analyzes a cause and effect relationship, or a correlation analysis, which may analyze how two different entities are related. Additionally, methods of relationship extraction may be combined together to increase potential success rate. Furthermore, different methods of relationship extraction and entity recognition may be mixed and matched to achieve different results. In some cases, the results of relationship extraction and entity recognition may be combined, while in other cases they may be independently determined and presented as a correlated set. Some combinations may be more efficient in certain situations while others may be more successful in other situations. In other cases, where authoritative and non-authoritative are input into the system, a combined output via an ensemble approach may be produced as the final result. For reference, ensembles may combine multiple possibilities to discern a possibility with a higher probability. This disclosure does not limit the systems and methods described herein to any one method or combination of methods but rather recognizes the value to testing different combinations to achieve the desired results.

The aforementioned techniques rely on the identification of certain words and phrases in some contexts. These words and phrases may be considered clue words, because they give clues as to the eventual conclusion, insight, or finding sought by the system and to the relation between different words or phrases. These clue words may be predefined and may be used to teach or refine machine learning aspects of the domain review system.

At operation 210, insights are identified using the extracted relationships. Insights may comprise results in some form pertinent to the search being performed. For instance, on a process performed on a study of diseases in the United States, a particular insight might be the prevalence of a particular disease, or which demographics of the population are affected by a certain disease in the United States. Insights are not limited to actual text in the document. Furthermore, insights may be garnered from a series or body of literature on a subject.

The process ranks the extracted relationships based on analysis of the relationships to identify an insight or set of insights corresponding to the domain at operation 212 using ranking component 118 in FIG. 1, for example. The ranking may be based on criteria, which may be received in association with the request for the domain review or may be automatically determined by the domain analysis system using one or more algorithms, for example. Such algorithms need not be static and indeed may be changed by the computing device itself or another non-user entity. Such would be the case if the computing device itself "learns" that certain results are more pertinent to the requested operation using machine learning techniques. Additionally, the computing device may receive feedback from another computing entity and set additional criteria for the search results.

The ranked results may be returned to a requesting device or entity, or may be used to generate and/or update a dynamic comprehensive domain review. Results from cumulative searches may be presented at once or in a series of results. The results may then be filtered according to additional criteria.

Figure 2B:
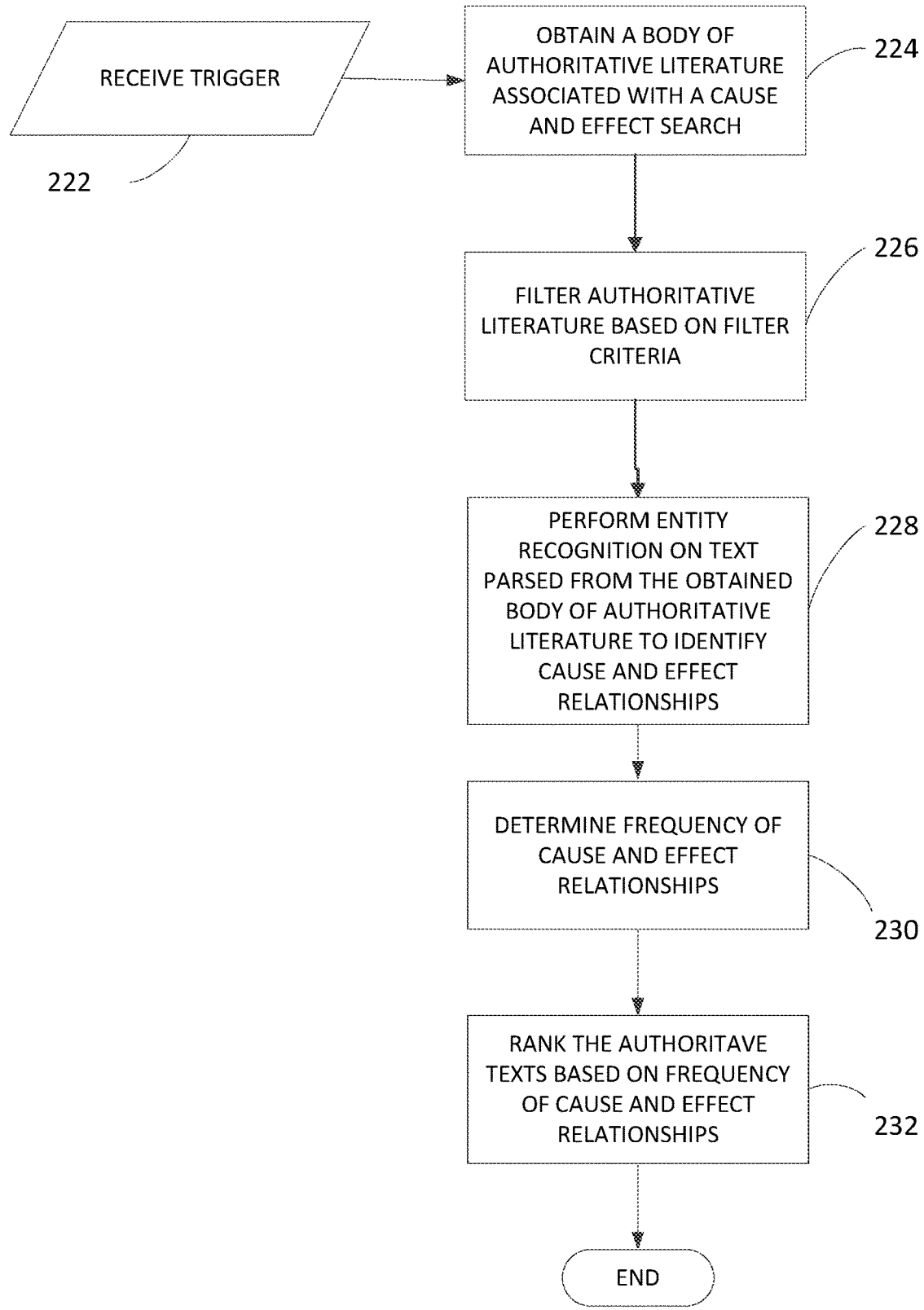
FIG. 2B is an exemplary flow chart illustrating operation of the computing device in a health centric web query context.

Referring to FIG. 2B, an exemplary flow chart illustrates operation of a domain analysis engine with regards to a health centric web query. The illustrative process may be performed by an analysis engine, such as domain analysis engine 110 in FIG. 1, for example. In FIG. 2B, the process begins at operation 222 by receiving a trigger. A trigger may be initiated based on criteria such as the occurrence of a specific event, a predetermined trigger or schedule, or a request for domain information, for example. In some examples, the process may also be automated or may be initiated based on a form of machine learning or artificial intelligence. Any manner of initiation is contemplated by this disclosure and is not limited to the described initiation processes described herein. The process continues by obtaining a body of authoritative literature associated with a cause and effect search and at operation 224.

The system then filters the authoritative texts based on a set of criteria at operation 226. Filtering may be performed by domain identification component 112 and may include identity of the institute authoring the text, page rank of the relevant documents, reputation of the journal in which the text is found. At operation 228, entity recognition is performed on the identified authoritative literature in the same manner as described in FIG. 2A using entity recognition component 114 on text parsed from the obtained body of authoritative literature to identify one or more entities. At operation 230 the system determines frequency of the cause and effect relationships using relationship extractor component 116 and entities recognized by entity recognition component 114 in addition to any relevant phrases or words that are related to the identified entities. At operation 232, the system ranks the authoritative literature using ranking component 118.

Referring to FIG. 3, the step of entity recognition and relationship extraction in the context of a search is described. In some instances, the search is conducted on material previously identified and/or obtained, such as authoritative literature corresponding to the domain of interest, for example. In some cases, the authoritative literature may be abstracts or summaries of professional journals, peer-reviewed publications or studies, and the like. The parameters of the search are defined by the user, the computing device, a third entity or any combination of the above. Furthermore, the search may be refined in a number of different ways, from user interaction to machine learning. For example, a keyword search may be performed. A keyword search analyzes the document and searches for specific words. The specific words may be provided by a user or determined by the computing device or another device or entity. Keywords may be used individually, in combination or any other permutation as desired. In the context of machine learning, the system may be trained using ground truth words, which in some cases may mean a set of words which are defined as being recognized entities. The training data should include the final output (ranked relations/insights).

Referring to FIG. 3, in the example presented, an online medical journal is analyzed. However, it will be appreciated that the search methods and tools presented herein are not limited to medical journals or the health domain, but may extend to any domain or subject matter area. Professional papers, thesis, dictionaries, encyclopedias and other online resources are also contemplated. Indeed, any text of authority on a subject to be searched and/or analyzed is contemplated by the current disclosure. A resource 302 has been targeted for entity recognition. Such targeting may be based on identification of resource 302 as authoritative literature associated with the subject domain being searched and analyzed. Resource 302 is analyzed according to the methods described herein. Analysis of resource 302 is performed by entity recognition component 114, which identifies a particular aspect of resource 302 from which entities are to be extracted. In the example presented, entity recognition component 114 identifies a sentence 304 in resource 302 as being pertinent based on at least one of search parameters, machine learning, adjustable criteria or any other method of searching for information. In some examples, domain review engine 110 is trained to recognize conclusory sentences, or headers such as "conclusions" and parse data from those portions of the literature to extract and identify findings. In this example, the sentence identified states "Excessive drinking is associated with higher rates of sunburn among American adults."

The domain review engine 110 performs entity identification on the identified text using entity recognition component 114. Results 306 show the identified entities. In this example, "Excessive drinking", "sunburn" and "American adults" are identified as entities. Entity recognition may also classify the identified entities based on identified and/or extracted context. For instance, in the example presented, "American adults" is identified as context in relation to "Excessive drinking" and "sunburn." These results are then passed to relationship extractor component 116 to identify and extract a relationship or relationships between the recognized entities.

Figure 4A:
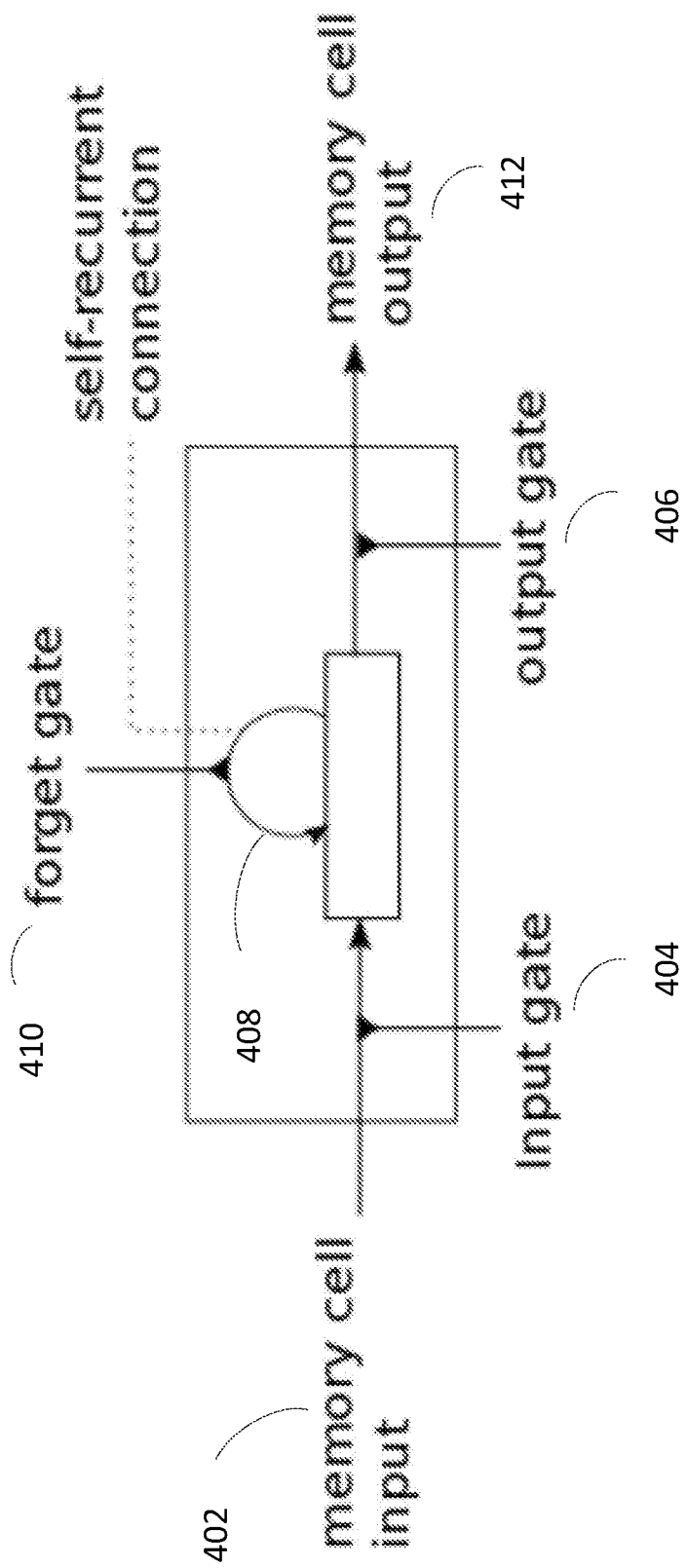
FIG. 4A is a schematic diagram of a type of recurrent neural network
Figure 4B:
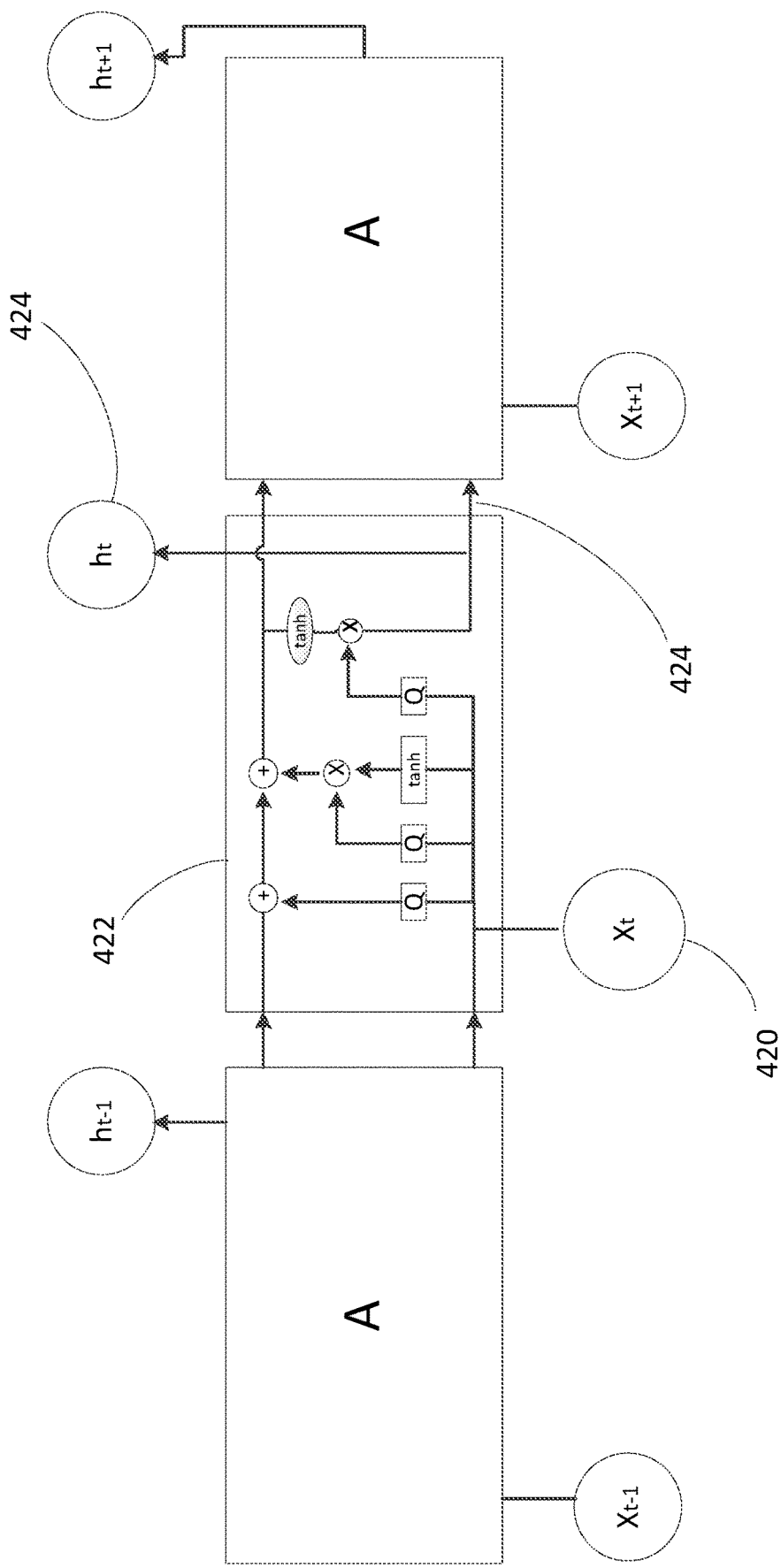
FIG. 4B is a block diagram depicting a zoomed in view of a type of Long Short Term Memory (LSTM) network used to extract relationships.

FIGS. 4A and 4B describe a method of relationship extraction as performed by relationship extractor component 116. It should be noted that the method described herein is only for illustrative purposes. Many different forms of relation extraction may be used. Such forms may be performed or directed by individuals whereas others may be performed by machines or systems on their own. Additionally, in the context of each, there are further combinations and options that are possible. For example, in the context of machine learning, the system may be trained using ground truth words, which in some cases may mean a set of words for which a relationship is predefined. These ground truth clue words may be used to identify other clue words. FIGS. 4A and 4B describe a method of relation extraction particular to the machine learning context. Clue words may be one type of feature used by the system. Additionally, using machine learning, the system may learn certain combinations or other such relations between entities over time. As an example, a machine learning may use feature engineering. In such a system, new features may be learned. Suppose f1=thunder and f2=lightning. A machine learning system implementing f1*f2 machine learning may understand that the combination to infer "thunderstorm."

Referring to FIG. 4A, a form of Recurrent Neural Networks (RNNs) is described. Traditional neural networks do not have persistent knowledge, that is, the network re-learns each time. RNNs have loops in their logic, allowing information to persist. FIG. 4A shows a schematic diagram of a Long Short Term Memory (LSTM) RNN. In the diagram, a portion of a neural network takes in as input a memory cell value 402 at input gate 404 and outputs another memory cell value at output gate 406. A loop 408 allows information that is output to be passed from one step of the network to the next, the next step of the network being identical schematically to the previous step. Information may also be removed through forget gate 410. A RNN may be an artificial neural network where connections between units form a directed cycle, for example.

FIG. 4B is a block diagram depicting a zoomed in view of a type of Bi-Directional Long Short Term Memory (LSTM) network used to extract relationships. In some cases, the steps between where the relevant information enters the network and the place where that information is needed is small, RNNs can learn to use the past information. However, in certain cases, there are a significant number of steps between when the relevant information is input into the network and the point at which it is needed. Standard RNNs have a very simple structure. LSTMs have a chain-like structure, with a more complex structure than a standard RNN, as shown in FIG. 4B.

Multiple levels of layers are used to understand groupings of words. A first layer may look at word pairs, while a second layer looks at a group of three words, and a third layer looks at a group of four words, and so on. The model uses input gates, memory cell, forget gate, output gate, and memory cell output to process a sentence or phrase or other textual input to understand and identify relationships, such as causal or correlation relationships between entities.

As shown, input value 420 enters processing logic 422. Input value 420 may be an individual token, e.g. $X_t$, extracted from a tokenized selection of text, for example. Output value 424 is output from processing logic 422. Output value 424 may be a hidden state, e.g. ht, generated via sigma transformation performed on an individual token, which is then passed to the next module. Output value 424 may then be used as input to the same processing logic as processing logic 422 in another iteration.

Using processing logic 422, the LSTM first decides what information to discard. The LSTM next decides what new information will be needed. This information may be used to update certain values in the system. The processing logic 422 comprises an "input gate layer" which decides which values will be updated and a tan h layer, which determines if other values are to be added to the current state. A tan h is a mathematical function performed on the values. A vector relationship is established with the values and the states. Vector representation is performed on text input, automatically encoding semantic association with words, tokens, or entities in text. For example, words, tokens, or entities in text may be positioned in vector space such that the relative proximity of position in the vector space for each of the words, tokens or entities indicate common context in the corpus of text input. That is, words that share common contexts in the given text input are located in close proximity to each other in the vector space. As an illustrative example, a generated vector representation using a corpus of text input may provide "king−man+woman=queen."

If other values are to be added to the current state, the necessary values will be combined to create an updated state. The old state is then updated with the updated value. In this manner, the system proceeds through several more steps, storing and updating values through the process. The end result is a value that may be output by the system at output 424. Confidence scores may be assigned to the output values to determine whether a particular output value should in fact be output by the system. The confidence scores of multiple output values may be compared against each other and the confidence value of the input. In this manner, the system may hone its own results. Thus, the type of machine learning described herein applies a causal relationship function to the input data of LSTM networks. It will be appreciated by one of skill in the art that the confidence scores may be applied to identified clue words or phrases or other features, indicating the causal relationship between the extracted entities.

Figure 5A:
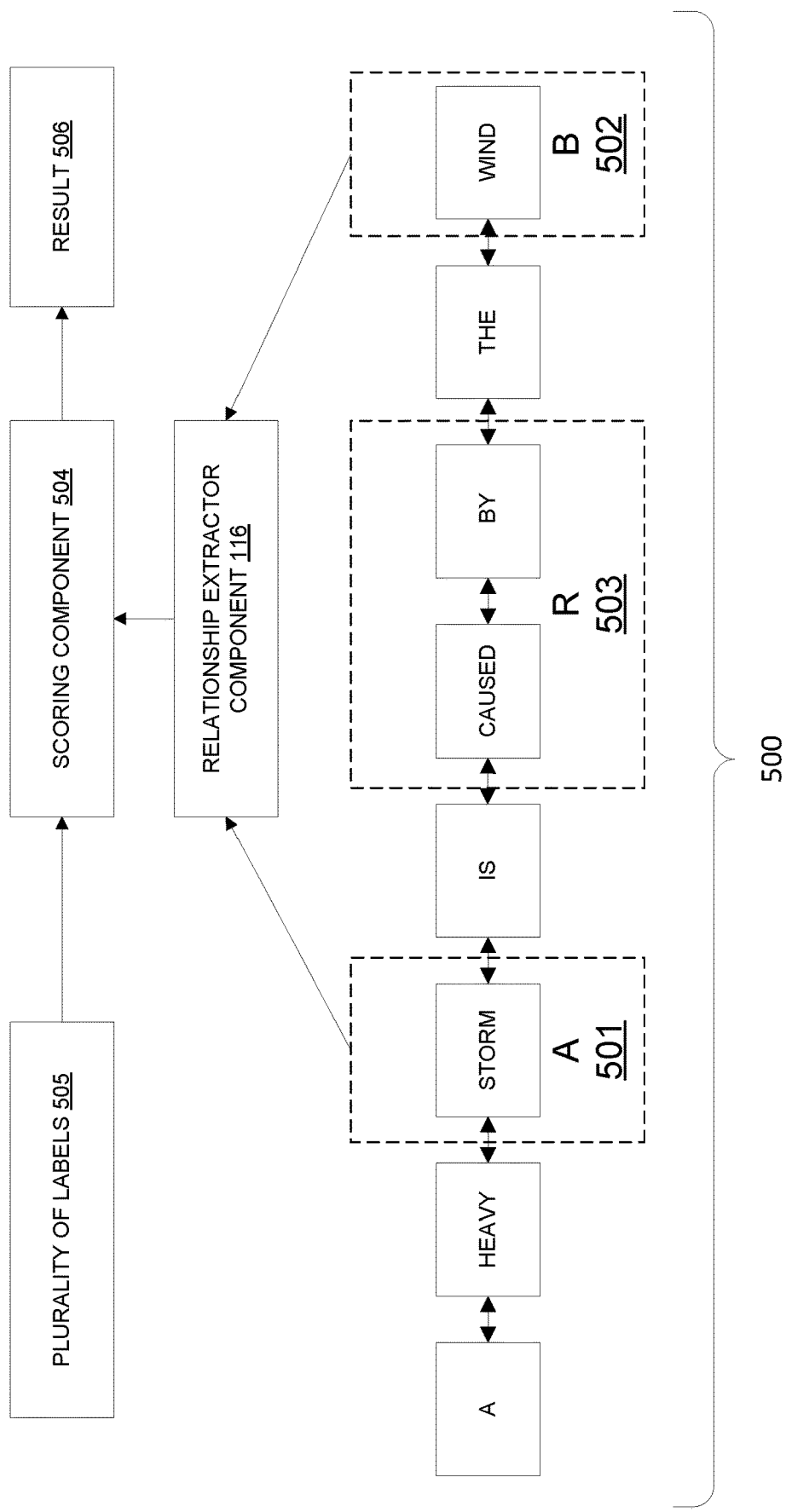
FIG. 5A is an example of the ABR model of relationship extraction.

Referring to FIG. 5A, another example of relationship extraction is shown. FIG. 5A is an example of the ABR Model used in conjunction with the LSTM model by domain review engine 110 of FIG. 1 to generate a domain review, such as domain review 120 in FIG. 1. Using the ABR model, domain review engine 110 recognizes entities for which a relationship is sought. The entities are recognized using entity recognition component 114 based on the relevant data, sentence, or other material previously identified by domain identification component 112. Entity recognition component 114 passes the identified entities to relationship extraction component 116, which extracts at least one relationship between the identified entities. This relationship may be identified based on words, numbers, groups of words, connectors, or any other method of correlating the entities. The relationship is extracted and ranking component 118 uses the extracted relationship to perform further analysis and rank results of the domain search.

In FIG. 5A, the exemplary sentence 500, stating "A heavy storm is caused by the wind," is depicted as run through the ABR model used by domain review engine 110. Although FIG. 5 uses a sentence as an example, one of skill in the art will recognize that the process described may be performed on a sentence fragment, a paragraph, a phrase, or any similar body of text.

The domain review engine 110 recognizes "storm" and "wind" as entity A 501 and entity B 502, respectively using entity recognition component 114. Using the ABR (relation between entity A and entity B) model of relationship extraction, the words "caused by" are recognized as the relationship R 503 between the entities "storm" and "wind," and extracted using relationship extractor component 116. The domain review engine 110 then determines the nature of the relationship using scoring component 504. Plurality of labels 505 corresponding to different types of relationships may be used by scoring component 504 to score the identified extracted relationships. In the example of FIG. 5A, the label of "causation" might be applied to relationship R 503 between entity A 501 and entity B 502, for example. Domain review engine 110 may analyze different potential relationships between the entities extracted and choose or rank the corresponding relationships using ranking component 118. Domain review engine 110 may combine the relationship extraction with entity recognition to produce a result 506, which is then ranked and used to generate or refine the domain review. In some examples, result 506 may be a sentence matching score of each label. Additionally, deduping of the insights or ensuring diversity among the insights may be performed in the construction of the domain review. Deduping is the analysis of data to remove or otherwise account for duplicate entries or data. In some instances, deduping may be performed by raking component 118 in analyzing the results. Ranking component 118 may combine duplicate or similar results and give an aggregate result a higher rank. Ranking component may otherwise account for similar data to ensure results presented reflect a diversity of insights into the text or body of texts being searched while maintaining the integrity of the results.

Figure 5B:
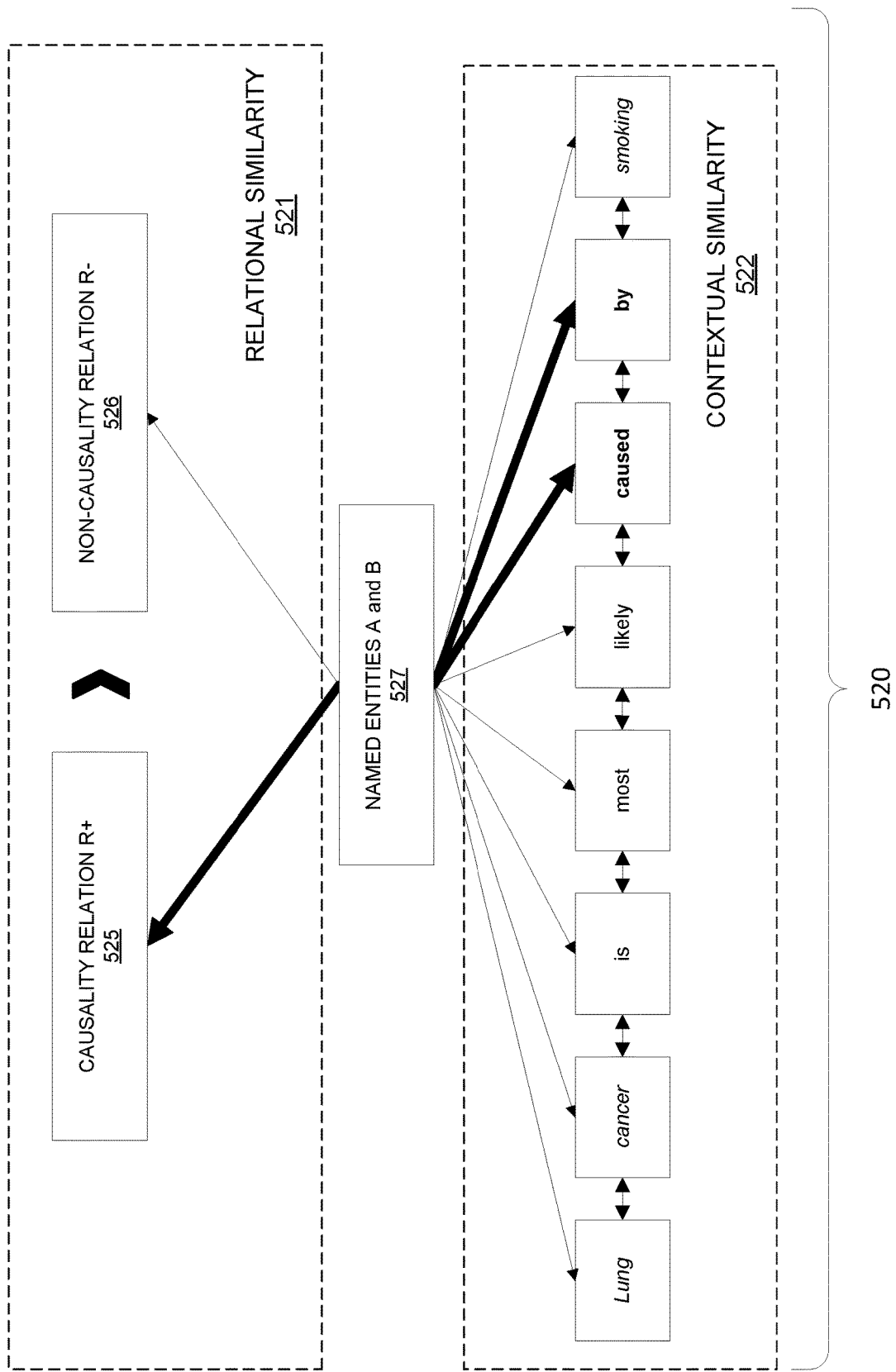
FIG. 5B is an illustration of modeling of relational similarity and contextual similarity.

FIG. 5B is an illustration of modeling of relational similarity and contextual similarity. The upper half of FIG. 5B shows relational similarity 521 applied to named entities A and B 527. Relational similarity modeling focuses on interactions between named entities and relations in the vector space. When the named entity A goes through a transformation process induced by the relation, the intent of relational similarity modeling is to force the transformed entity to be translated to the other named entity B in the same vector space so that the relation holds between the two named entities. causality relation R+ 525 denotes the positive causality/correlation relation between the named entities A and B 527, while non-causality relation R− 526 denotes a noncausality/non-correlation relation between named entities A and B 527. A ranking approach maximizes the similarity score between the named entities A and B 527 and a causality relation R+ 525 while minimizing the score with the non-causality relation R− 526, thus ensuring that the positive connection is larger than the negative one (as indicated by the greater than sign between causality relation R+ and non-causality relation R−). In FIG. 5B, thicker arrows indicate stronger similarity between named entities A and B 527 and relation.

Contextual similarity 522, as shown in the bottom half of FIG. 5B, can increase model weights onto important context clue words, thereby better utilizing contextual information. The sentence "Lung cancer is most likely caused by smoking" is used as an example to demonstrate contextual similarity. Clue words that require model attentions usually include, for example, "lead to", "is associated with", "because of", while others are not obvious, such as "promote", "reflect", "reduce", and "make". In FIG. 5B, context clue words "caused by" (shown in bold) receive higher attention weights than neighbor words. In FIG. 5B, "Lung cancer" and "smoking" (shown in italics) are identified as the named entities A and B 527. In FIG. 5B, thicker arrows indicate stronger similarity between named entities A and B 527 ("Lung cancer" and "smoking") and context ("caused by"). The contextual similarity model is used to generate re-weighted sentence representations, which is used together with entity representations for relation extraction.

Figure 6:
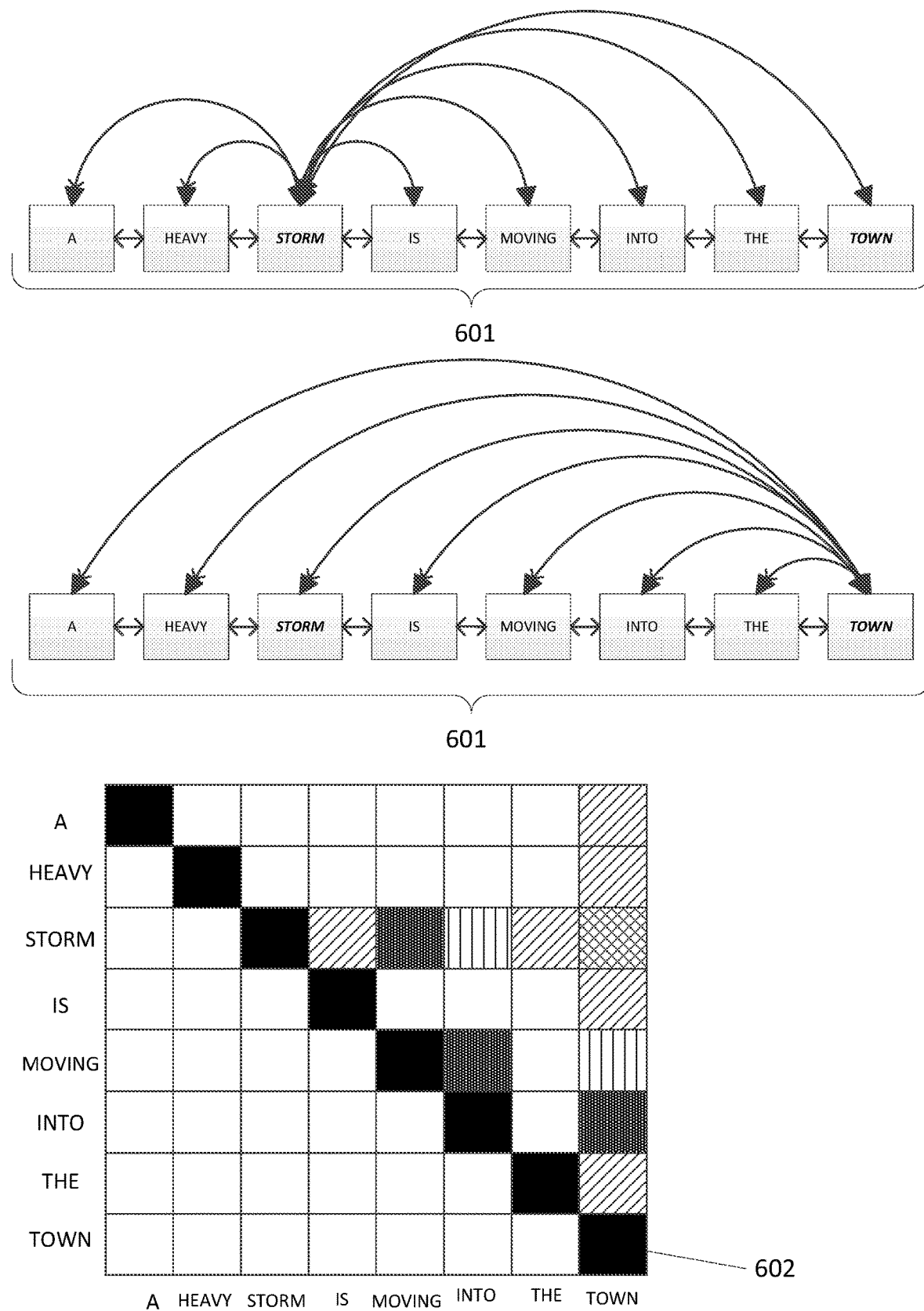
FIG. 6 is an example of the Pinpoint model of relationship extraction.

FIG. 6 is another example of relationship extraction performed by domain review engine 110. This illustrative method uses the pinpoint model to determine a relationship to be extracted between two entities. In the example presented, the sentence "A heavy storm is moving into the town" 601 is analyzed by domain review engine 110 in FIG. 1. In the example, domain review engine 110 has already recognized the words "storm" and "town" as entities. The computing system uses the pinpoint model 602 to determine a relationship or relationships between the entities. As can be seen in the illustrative pinpoint model 602, domain review engine 110 creates a matrix or grid of all the terms in the sentence. Pair-wise Relationships are determined between the various words based on algorithms performed on the matrix. The results of this analysis may be associated with a label, as described with regards to plurality of labels 505 of FIG. 5A in a manner similar to the process described in FIG. 5A. The sentence is also scored in a similar manner and ranked as in FIG. 5A. It will be appreciated by those of skill in the art that in the example presented, the pinpoint model is performed on top of the LSTM model described previously.

In the preceding examples, different methods of relationship extraction have been described. In particular, the ABR model was described and the Pinpoint model. It will be appreciated by one of skill in the art that other methods of extracting relationships are also contemplated. Some of the methods include, but are not limited to, the Attention model and the Tree structure model. Additionally, other models or methods may be used to extract relationships between recognized entities. Additionally, the models may be used in conjunction with each other or with other combinations. For example, the Tree structure depicted, which denotes dependency parse trees, may be used with the Attention model to form a Tree Structure Attention model. This may be further combined with the Pinpoint model. In each case, the accuracy of the resulting search is investigated to determine the ability of the individual or combined model to return results pertinent to the search commissioned. Additionally, each of these models may be combined with the LSTM network model or any other type of recurrent network model that performs entity recognition. Confidence scores and vector analysis may be performed on the values output by each of the techniques or combinations thereof. For example, in the context of speech recognition, a vector representation may be created of the words that form a semantic association between the recognized entities. The processes described above may be performed by a classifier.

Domain review engine 110 may also derive context related to the literature and/or domain searched, and extract meta-features related to the search, using a context parser or other parsing tool. These contextual features and metafeatures may be used to further refine the results sent to the ranking component 118. For example, for a search directed to a medical domain, context may include user demographics such as age, gender, study cohort size, geography, habits, etc.

Figure 7:
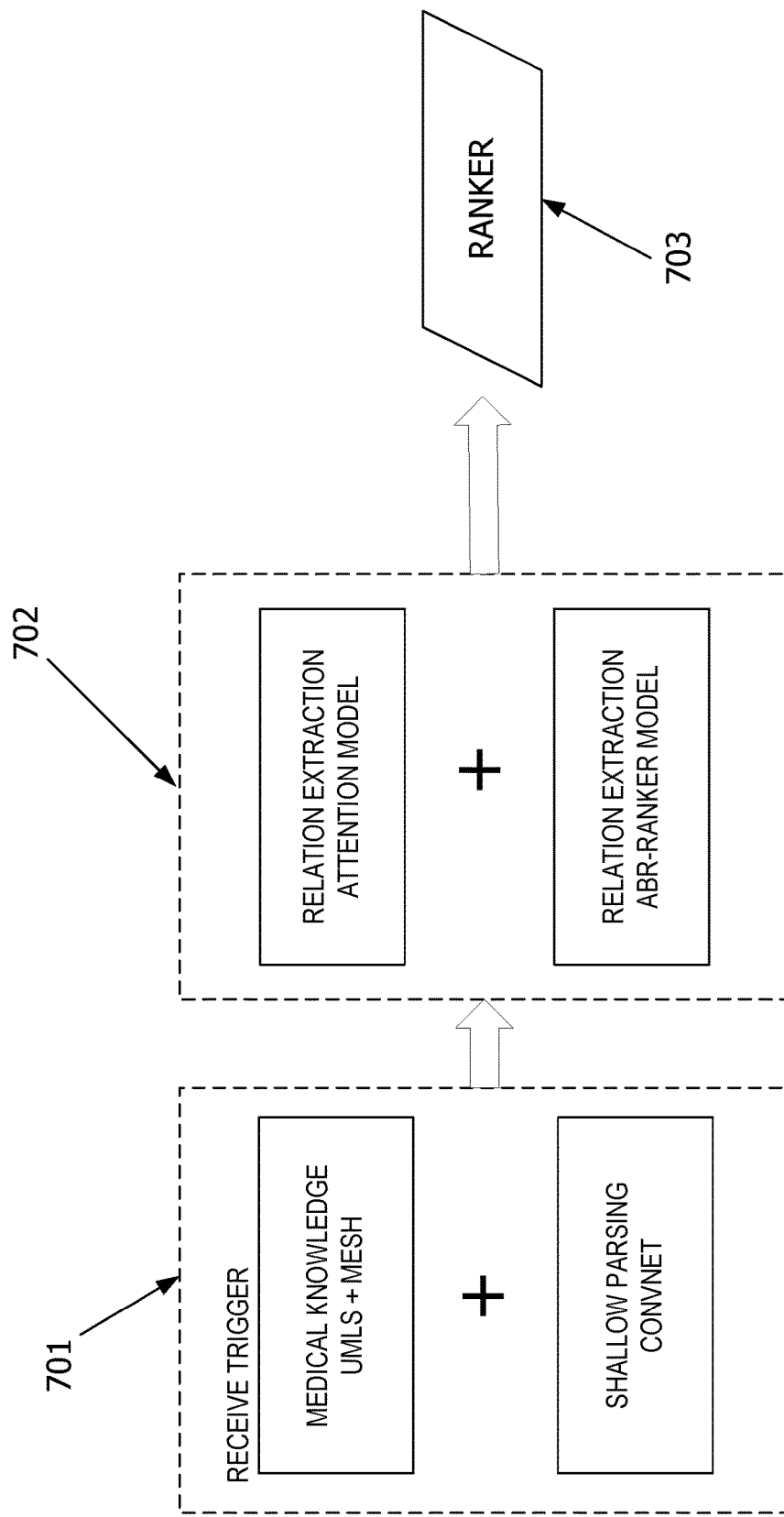
FIG. 7 is a block diagram illustrating an example of providing data to the ranker.

Referring to FIG. 7, data flow to the ranking component 118 is depicted in one illustrative example. The process depicted may be performed by domain review engine 110 of FIG. 1, for example. Entity recognition is performed at operation 701 by a combination of processes. In particular, entity recognition is performed by the processes of combining domain knowledge available on certain databases with shallow parsing techniques of convolution neural network otherwise known as a convnet. A convnet is a form of artificial neural network. Other entity recognition techniques may similarly be combined at operation 701. This analysis is combined with the analysis of the relationship extraction techniques of an Attention model and the ABR model at operation 702. Similar to entity extraction, other relationship extraction techniques may be used along with the Attention model and ABR model. The results of these processes are then sent to a ranker process at operation 703. Ranking component 118 takes the results of the previous processes and, using modeling or mathematical techniques, ranks the results to identify insights, conclusions, and/or findings pertinent to the domain. In the particular example shown, ranking component 118 uses textual similarity based on convolution neural network analysis to rank the results. In some instances, the domain search engine updates the dynamic domain review upon extracting new insights. Additionally, results returned to the user may then be used to refine the search either manually, automatically or through machine learning. Thus, the knowledge gained through one iterative process is fed back to improve results and accuracy.

An illustrative experiment was conducted on a dataset of medical/health publications annotated on Universal Human Relevance System (UHRS), a crowdsourcing platform for end-to-end system evaluation, to verify results of ranking component 118. The dataset consisted of 100 publications from biomedical/health journals, which were then annotated on UHRS for evaluation. An annotation interface on UHRS, which displays instructions, title/abstract texts of publications and a list of top ranked extracted insights from the system output, was used to perform the experiment. The order of extracted insights was randomized and the annotators were asked to verify whether the extracted insight was correct.

For each biomedical publication, top 10 candidate insights from the system were listed for further inspection. In the experiment, used to verify one embodiment of the output of ranking component 118, the annotators were required to understand the texts, carefully inspect each insight, and finally either accept it if it was one of the article insights or reject it. The system evaluation was completed by five expert annotators each of whom hold postgraduate degrees and/or have biomedical background. Another system, using a bidirectional gated recurrent neural network model (Bi-GRU), was used as a baseline to compare against the evaluated system. Bi-GRU is a variant of LSTM/RNN. The difference between the baseline system and the system under evaluation was the relation extraction component of the system under evaluation. Evaluation was based on average accepted accuracy of highest ranked extracted insight and top three ranked extracted insights output from the system, the acceptance accuracy based on the expert annotators. For this experiment, performed on a single embodiment of ranking component 118, the average accepted accuracy of the top three ranked extracted insights of the evaluated system was 50.6%, significantly higher than the baseline system, which was 21.3%. Furthermore, the acceptance accuracy of the highest ranked extracted insight of the evaluated system was 63% in comparison to that of the baseline system's 21%, in this experiment involving one embodiment of ranking component 118.

Additional Examples

Examples of the disclosure provide a system and method for parsing text, such as bodies of literature, to identify cause and effect relationships between entities, and extract insights from those identified relationships that may be used in generating a summary or overview of a subject matter area. For example, an abstract section of a peer-reviewed journal may be analyzed and a finding or "take away" identified by using the methods and systems described herein, that is entity recognition and relationship extraction. This take away information identified by the system may then be used to generate or update a knowledge base associated with the domain, or subject matter, of the journal. For example, if the journal is a medical journal, the take away identified may be used for a health knowledge base, which in turn may inform or otherwise provide data to a health application or device, such as a wearable device implementing a personal health application. By mining bodies of literature to generate, maintain, and update the domain knowledge base, vast amounts of disparate information located across many different sources can be cohesively aggregated to provide an overview of an entire subject matter area. These identified findings or insights, or take away data, may be located anywhere within the text of a document or literature source, and may be manually labor intensive to identify and confirm with existing solutions. By automating the search with intelligent machine learning systems using the methods described herein, these insights can be identified and utilized pro-actively or on-demand, increasing both processor efficiency for applications supported by the domain review knowledge bases and user efficiency in interacting with the domain review information and the supporting applications.

In some examples, a part of analyzed text—such as a sentence or phrase—is tokenized by the domain review engine and input into a classifier, such as a machine learning processor, using a LSTM model to label the causal relationship token identified, which may then be used as input to the classifier for future identification of causal/correlation relationships in text. In other examples, the ABR model rule is built into neural nets in vector space, as an ABR-Ranker model, which allows for identification of entity destination relationships and entity causality relationships by the system. By using the ABR-Ranker model on top of LSTMs, the tokenized input can be labeled and the part of text, such as a sentence, scored based on the labels. In these examples, a machine learning component of the domain review engine may analyze the scored identified relationship tokens and recognize that one word has a lower confidence of being a causal term between entities than another word with a higher confidence score relative to cause and effect between the recognized entities of the given analyzed text. The existence of multiple entities in a sentence, for example, does not necessarily indicate that a correlation or causal relationship is present. Thus, beyond shallow parsing techniques and parts of speech tagging, examples of this disclosure identify when such a relationship is present, extract and score that identified relationship, and further use the extracted and identified relationship to refine future parsing and insight identification. In this way, the classifier, or machine learning component, of the domain review engine learns the ABR function and applies the function to all future input data in the LSTM model. In other words, providing the classifier with its ground truth, that is entity A and entity B along with a confidence value of a probability that there is a causal relationship between A and B provides hyperparameters for the classifier that improve its ability to identify other causal relationships with unknown words in future text parsing. This is how the classifier learns to identify clue words on its own.

In other examples, the domain review engine uses an attention mechanism with LSTM model, which provides the domain review engine the ability to look for and utilize clue words automatically. For each identified context word, an attention weight is applied to re-weight the context identified.

Other models that may be used by the domain review engine may include the pinpoint model with very deep ConvNets, or a Tree-Structured Attention-based Ranker Model, for example.

In some examples, a base ranking score of a relation is provided by the relationship extractor component. The base ranking score of the relation may then be boosted by measuring the textual similarity between a title sentence of the body of literature and the relations identified. If the sentence extracted is from the title sentence, the conclusion sentence, or the first sentence of the abstract, the base ranking score may also be boosted. This provides a bias towards these parts of literature where insights or take away information is typically found.

Examples of the disclosure further provide for surfacing contextually relevant insights. Context information may be received as a trigger for the methods and systems described herein. For example, a wearable device or health application implemented on a user device may provide context data as a trigger to surface contextually relevant insights for a user associated with the provided context data. The provided context may be that a user is drinking and outdoors in a sunny environment, for example, which may result in surfacing the authoritative insight that drinking may increase a risk of sunburn. In this way, aspects of the disclosure consider any contextual or other provided and/or obtained information about a user (i.e. age, gender, nationality, biometric signals, location, etc.) and surface relevant results for the particular user. Extracted content or insights obtained from bodies of literature may also be contextually ranked and/or surfaced for output. As another example, a trigger to surface a result, or raise a result to the level of output, may be an identification of the same or substantially similar result in multiple authoritative sources. Any identified reported statistical significance may also be captured and provided as an output. For example, rather than providing an insight that drinking increases sunburn, a statistical result may be provided that indicates a 1.5 hazard ratio associated with drinking and sunburn.

In addition, ranking may be based on context which is personalized to the user independent of the context of the trigger. For example, the context of the trigger for the search may be that user is drinking and outdoors in a sunny environment, whereas the context of the ranking may be geographic location. In other instances, ranking may be strictly limited to contextual triggers.

Aspects of the disclosure may also aggregate insights in generating a domain review. For example, an output may indicate that k of n of the top ranked journals indicate a particular conclusion or finding, such as the illustrative insight that drinking increases a risk of sunburn. Alternatively, a graphical visualization may be provided that summarizes the extracted insights, their relative strengths, positive or negative relationship (for relationships having a direction and/or degree), and allow users to drill down into the summary information for more detailed information. Such summary information may also be used to build probabilistic models. For example, if a user provides trigger information, such as a lung cancer diagnosis, aspects of the disclosure may provide a result that indicates "knowing you are not a smoker, it may have been all the air pollution from living in proximity to a freeway."

Snippet generation and/or rewording of identified or extracted insights may also be contemplated by aspects of the disclosure. Extracted insights may be aggregated and provided in a more consumable form, relative to a user and/or a user application or service. For example, template rules may take raw insights and customize them for a user's context (i.e. language, screen size, etc.). Users may be able to drill down in the provided results by selecting a link to see more information pertaining to the selection, for example. Vector forms of the relationships and entities may also be used to help with the generation of such snippets using a reverse Vec2Word type of mapping, in some examples.

Other triggers to the system and methods described herein may be user queries. For example, a user may ask "does drinking increase the risk of sunburn?" or may simply input "drinking sunburn" as a query to the system. In other examples, the system may surface results based upon an automatic and/or implicit contextually-based query received.

Feedback of user response and/or behavioral consequences of provided results may also be surfaced as a ranking function. For example, if a user has a high heart rate, which may be a data point provided as context data input or a trigger in some examples, and a result is provided "taking a deep breath has been shown to reduce heart rate" the behavioral and/or biometric feedback received in response to providing that result may be used to rank the insight. In this example, a physiological measurement device, such as a wearable device, may detect that for k of n people who received this illustrative result, a corresponding heart rate when down relative to a point in time the result was provided, which may lead to increasing the ranking signal for that result in these examples. Aspects of this disclosure provide a large body of contextually annotated insights to draw from and use in refining the results and/or insights being surface as output.

Although cause and effect phrases and context are described herein in some of the provided illustrative examples, the disclosure is not limited to cause and effect findings. Other insights, findings, and conclusions may be identified using the systems and methods described herein.

The extracted findings may be used to create a timeline or aggregate of research around a topic, subject matter area, or domain. In some examples, other bodies of literature may be contemplated, such as online forums and chat rooms dedicated to a domain, for parsing, identifying and extracting insights.

Aspects of this disclosure may be performed on-line, off-line, or both on-line and off-line. For example, an off-line cloud service may perform one or more operations and send updates to an indexer, while on-line an application may interface with the indexer or query the indexer to obtain knowledge for a particular domain or topic.

Alternatively, or in addition to the other examples described herein, examples include any combination of the following:

wherein the dynamic domain review comprises at least one of a domain timeline or a domain research aggregate;

wherein the domain search engine updates the dynamic domain review upon extracting new insights;

wherein the domain search engine further comprises a machine learning component that automatically identifies clue words associated with at least one of a causal relationship or a correlation relationship using entity recognition and relationship extraction mechanisms;

wherein the machine learning component is trained using ground truth clue words;

wherein the automatically identified clue words are distinct from the ground truth clue words;

wherein the machine learning component is trained to apply a causal relationship function to input data in a long short-term memory model network;

wherein the machine learning component associates a confidence score with an identified clue word, the confidence score directed towards a probability of the identified clue word having at least one of the causal relationship or the correlation relationship between entities;

wherein the trigger is an occurrence of a specific event, a predetermined occurrence or a query;

wherein the domain review engine further identifies a context associated with the received trigger and ranks the extracted results based at least in part on the identified context;

a vector representation of a causal function that encodes semantic association with entities in text;

a classifier that processes input data using a long short-term memory model network and the vector representation to identify clue words, the domain search engine using the identified clue words to extract the insights and generate the dynamic domain review;

a ranking component that weights one or more extracted insights based on causal relationships using the vector representation and confidence scores associated with the identified clue words;

a context parser that identifies contextual features of the extracted insights and generates context metafeatures for the dynamic domain review;

wherein the obtained literature includes at least one of authoritative literature and non-authoritative literature;

wherein the entity recognition is performed using shallow parsing techniques and domain-specific entity dictionaries;

wherein extracting the one or more relationships further comprises: identifying one or more clue words associated with the identified one or more entities using a correlation function with a long short-term memory model network;

determining a confidence score for an extracted relationship based at least in part on the identified one or more clue words;

identifying contextual features associated with the extracted one or more relationships;

generating contextual metafeatures for the identified insight corresponding to the domain;

wherein the entity recognition is performed using shallow parsing techniques and domain-specific entity dictionaries;

wherein extracting the one or more relationships further comprises: identifying one or more clue words associated with the identified one or more entities using a correlation function with a long short-term memory model network;

identifying contextual features associated with the extracted one or more relationships;

generating contextual metafeatures for the identified insight corresponding to the domain.

At least a portion of the functionality of the various elements in FIG. 1 may be performed by other elements, or an entity (e.g., processor, web service, server, application program, computing device, etc.) not shown in FIG. 1.

In some examples, the operations illustrated in FIG. 2-3 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements. In some examples, circuitry such as a graphical processing unit (GPU) or field-programmable gate array (FPGA) may be used.

While the aspects of the disclosure have been described in terms of various examples with their associated operations, a person skilled in the art would appreciate that a combination of operations from any number of different examples is also within scope of the aspects of the disclosure.

In examples involving a general-purpose computer, aspects of the disclosure transform the general-purpose computer into a special-purpose computing device when configured to execute the instructions described herein.

The computing device described with regards to the present disclosure represents any device executing instructions (e.g., as application programs, operating system functionality, or both) to implement the operations and functionality associated with the computing device. The computing device may include a mobile computing device or any other portable device. In some examples, the mobile computing device includes a mobile telephone, laptop, tablet, computing pad, netbook, gaming device, and/or portable media player. The computing device may also include less portable devices such as desktop personal computers, kiosks, tabletop devices, industrial control devices, wireless charging stations, and electric automobile charging stations. Additionally, the computing device may represent a group of processing units or other computing devices.

In some examples, the computing device has at least one processor, a memory area, and at least one user interface. The processor includes any quantity of processing units, and is programmed to execute computer-executable instructions for implementing aspects of the disclosure. The instructions may be performed by the processor or by multiple processors within the computing device, or performed by a processor external to the computing device. In some examples, the processor is programmed to execute instructions such as those illustrated in the figures (e.g., FIG. 2).

In some examples, the processor represents an implementation of analog techniques to perform the operations described herein. For example, the operations may be performed by an analog computing device and/or a digital computing device.

The computing device further has one or more computer readable media such as the memory area. The memory area includes any quantity of media associated with or accessible by the computing device. The memory area may be internal to the computing device (as shown in FIG. 1), external to the computing device (not shown), or both (not shown). In some examples, the memory area includes read-only memory or memory wired into an analog computing device, or both.

The memory area stores, among other data, one or more applications. The applications, when executed by the processor, operate to perform functionality on the computing device.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Exemplary Operating Environment

Figure 8:
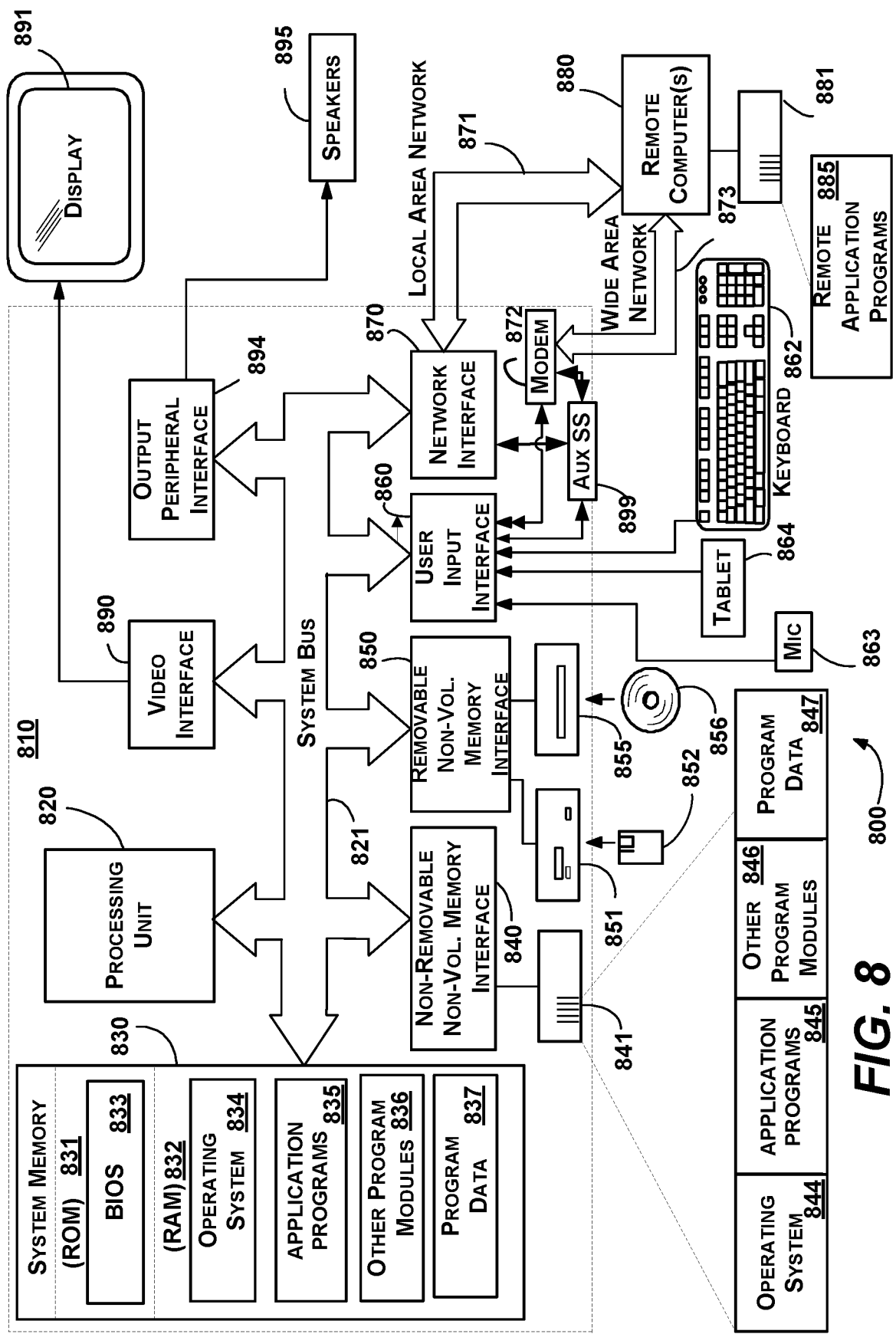
FIG. 8 shows an illustrative example of a computing environment into which various aspects of the present disclosure may be incorporated.

FIG. 8 illustrates an example of a suitable computing and networking environment 800 on which the examples of FIGS. 1-7 may be implemented. The computing system environment 800 is only one example of a suitable computing environment and is not intended to suggest any limitation as to the scope of use or functionality of the disclosure. Neither should the computing environment 800 be interpreted as having any dependency or requirement relating to any one or combination of components illustrated in the exemplary operating environment 800.

The disclosure is operational with numerous other general purpose or special purpose computing system environments or configurations. Examples of well-known computing systems, environments, and/or configurations that may be suitable for use with the disclosure include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and so forth, which perform particular tasks or implement particular abstract data types. The disclosure may also be practiced in distributed computing environments where tasks are performed by remote processing devices that are linked through a communications network. In a distributed computing environment, program modules may be located in local and/or remote computer storage media including memory storage devices.

With reference to FIG. 8, an exemplary system for implementing various aspects of the disclosure may include a general-purpose computing device in the form of a computer 810. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer-readable media. Computer-readable media may be any available media that may be accessed by the computer 810 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules and the like. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by the computer 810. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 830 includes computer storage media in the form of volatile and/or nonvolatile memory such as read only memory (ROM) 831 and random-access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836 and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media, described above and illustrated in FIG. 8, provide storage of computer-readable instructions, data structures, program modules and other data for the computer 810. In FIG. 8, for example, hard disk drive 841 is illustrated as storing operating system 844, application programs 845, other program modules 846 and program data 847. Note that these components may be either the same as or different from operating system 834, application programs 835, other program modules 836, and program data 837. Operating system 844, application programs 845, other program modules 846, and program data 847 are given different numbers herein to illustrate that, at a minimum, they are different copies. A user may enter commands and information into the computer 810 through input devices such as a tablet, or electronic digitizer, 864, a microphone 863, a keyboard 862 and pointing device 861, commonly referred to as mouse, trackball or touch pad. Other input devices not shown in FIG. 8 may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. The monitor 891 may also be integrated with a touch-screen panel or the like. Note that the monitor and/or touch screen panel may be physically coupled to a housing in which the computing device 810 is incorporated, such as in a tablet-type personal computer. In addition, computers such as the computing device 810 may also include other peripheral output devices such as speakers 895 and printer 896, which may be connected through an output peripheral interface 894 or the like.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more local area networks (LAN) 871 and one or more wide area networks (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860 or other appropriate mechanism. A wireless networking component such as comprising an interface and antenna may be coupled through a suitable device such as an access point or peer computer to a WAN or LAN. In a networked environment, program modules depicted relative to the computer 810, or portions thereof, may be stored in the remote memory storage device. By way of example, and not limitation, FIG. 8 illustrates remote application programs 885 as residing on memory device 881. It may be appreciated that the network connections shown are exemplary and other means of establishing a communications link between the computers may be used.

An auxiliary subsystem 899 (e.g., for auxiliary display of content) may be connected via the user interface 860 to allow data such as program content, system status and event notifications to be provided to the user, even if the main portions of the computer system are in a low power state. The auxiliary subsystem 899 may be connected to the modem 872 and/or network interface 870 to allow communication between these systems while the main processing unit 820 is in a low power state.

The examples illustrated and described herein as well as examples not specifically described herein but within the scope of aspects of the disclosure constitute exemplary means for performing an intelligent search on authoritative literature. For example, the elements illustrated in FIG. 1, such as when encoded to perform the operations illustrated in FIG. 2, constitute exemplary means for identifying search targets, exemplary means for performing entity identification, exemplary means for performing relation extraction, and exemplary means for ranking results of the search prior to providing the results to a user or a system.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system for generating a dynamic comprehensive domain review, the system comprising:
   a memory;
   at least one processor communicatively coupled to the memory;
   a long short-term memory model network, implemented on the at least one processor, trained to:
      receive authoritative literature as training data,
      identify one or more domains associated with the received authoritative literature,
      recognize conclusory content of the authoritative literature, and
      extract a plurality of entities from the conclusory content; and
   a domain search engine, implemented on the at least one processor, that:
      receives a request to generate the dynamic comprehensive domain review,
      identifies a particular domain and at least one contextual parameter associated with the received request, and
      generates the dynamic comprehensive domain review based at least on the trained long short-term memory model network, by implementing the at least one processor to:
      obtain literature associated with the identified particular domain,
      perform entity recognition on text parsed from the literature to identify one or more entities,
      determine one or more relationships between the identified one or more entities at least by implementing the at least one processor to:
         apply a causal relationship function to at least a pair of the identified one or more entities in the long short-term memory model network, and
         generate a vector representation of a causal function that encodes semantic association with the plurality of extracted entities in the long short-term memory model network such that a relative proximity of position in the vector representation in the long short-term memory model network indicates a common context among the pair of the identified one or more entities,
      extract a plurality of insights from the obtained literature based on the one or more determined relationships, and
      rank the extracted plurality of insights based at least in part on analysis of the determined one or more relationships and at least in part on the identified at least one contextual parameter associated with the received request.

2. The system of claim 1, wherein the dynamic comprehensive domain review comprises at least one of a domain timeline or a domain aggregate.

3. The system of claim 1, wherein the long short-term memory model network is trained to apply a correlation relationship function to input data in a long short-term memory model network.

4. The system of claim 1, wherein the long short-term memory model network associates a confidence score with an identified clue phrase, the confidence score directed towards a probability of the identified clue phrase having at least one of the causal relationship or a correlation relationship between entities.

5. The system of claim 1, wherein the request is triggered in response to an occurrence of a specific event, a predetermined occurrence or a query.

6. The system of claim 1, further comprising:
   a model that processes input data using the long short-term memory model network and the vector representation to identify at least one clue phrase, the domain search engine using the identified at least one clue phrase to extract the plurality of insights and generate the dynamic domain review.

7. The system of claim 6, further comprising:
   a ranking component that weights one or more of the extracted plurality of insights based on the vector representation and confidence scores associated with the identified at least one clue phrase.

8. The system of claim 1, further comprising:
   a context parser that generates context metafeatures for the generated dynamic domain review.

9. The system of claim 1, wherein the long short-term memory model network further receives non-authoritative literature.

10. The system of claim 1, wherein the long short-term memory model network is further trained by feeding the dynamic comprehensive domain review back to the long short-term memory model network.

11. A method for generating a comprehensive domain review, the method comprising:
    training a long short-term memory model network comprising:
       receiving authoritative literature as training data,
       identifying one or more domains associated with the received authoritative literature,
       recognizing conclusory content of the authoritative literature,
       extracting a plurality of entities from the conclusory content, receiving a request to generate the comprehensive domain review;
    identifying a particular domain and at least one contextual parameter associated with the received request; and
    generating the comprehensive domain review based at least on the trained long short-term memory model network, the generating comprising:
       obtaining, by a domain review module implemented on at least one processor, a body of literature associated with the identified particular domain,
       performing entity recognition on text parsed from the body of literature to identify one or more entities,
       determining one or more relationships between the identified one or more entities at least by:
          applying a causal relationship function to at least a pair of the identified one or more entities in the long short-term memory model network, and
          generating a vector representation of a causal function that encodes semantic association with the plurality of extracted entities in the long short-term memory model network such that a relative proximity of position in the vector representation in the long short-term memory model network indicates a common context among the pair of the identified one or more entities,
       extracting one or more insights from the body of literature based on the one or more determined relationships, and ranking the one or more extracted insights based at least in part on analysis of the determined one or more relationships and at least in part on the identified at least one contextual parameter associated with the received trigger.

12. The method of claim 11, wherein the entity recognition is performed using shallow parsing techniques and domain-specific entity dictionaries.

13. The method of claim 11, wherein determining the one or more relationships further comprises:
    identifying one or more clue phrases associated with the identified one or more entities using a correlation function with the long short-term memory model network; and
    determining a confidence score for at least one determined relationship of the one or more determined relationships based at least in part on the identified one or more clue phrases.

14. The method of claim 11, further comprising:
    generating contextual metafeatures for the one or more determined relationships corresponding to the domain.

15. The method of claim 13, further comprising:
    feeding back the dynamic comprehensive domain review to the long short-term memory model network.

16. One or more computer storage devices having computer-executable instructions stored thereon for providing comprehensive domain review, which, on execution by a computer, cause the computer to perform operations comprising:
    training a long short-term memory model network comprising:
        receiving authoritative literature as training data,
        identifying one or more domains associated with the received authoritative literature,
        recognizing conclusory content of the authoritative literature,
        extracting a plurality of entities from the conclusory content,
    responsive to receiving a request to generate the comprehensive domain review, identifying a particular domain associated with the received request;
    generating the comprehensive domain review based at least on the trained long short-term memory model network, the generating comprising:
        obtaining, by a domain review module, a body of literature associated with the identified particular domain,
        performing entity recognition on text parsed from the body of literature to identify one or more entities,
        determining one or more relationships between the one or more identified entities, wherein the determining comprises:
            applying a causal relationship function to at least a pair of the identified one or more entities in the long short-term memory model network, and
            generating a vector representation of a causal function that encodes semantic association with in the long short-term memory model network such that a relative proximity of position in the vector representation in the long short-term memory model network indicates a common context among the pair of the identified one or more entities;
        extracting one or more insights from the body of literature based on the one or more determined relationships; and
        ranking the one or more extracted insights based at least in part on confidence scores corresponding to the one or more determined relationships and at least in part on the identified at least one contextual parameter associated with the received trigger.

17. The one or more computer storage devices of claim 16, wherein determining the one or more relationships further comprises computer-executable instructions for:
    identifying one or more clue phrases associated with the one or more identified entities using a correlation function with the long short-term memory model network; and
    determining a confidence score for at least one determined relationship of the one or more determined relationships based at least in part on the identified one or more clue phrases.

18. The one or more computer storage devices of claim 16, wherein determining the one or more relationships further comprises computer-executable instructions for:
    processing input data including the one or more identified entities using the long short-term memory model network and the generated vector representation to identify at least one clue phrase, the at least one clue phrase used to extract the one or more insights.

19. The one or more computer storage devices of claim 16, having further computer-executable instructions comprising:
    generating contextual metafeatures for the one or more extracted insights corresponding to the domain.

20. The one or more computer storage devices of claim 16, wherein training a long short-term memory model network further comprises computer-executable instructions for:
    feeding back the dynamic comprehensive domain review to the long short-term memory model network.

* * * * *